(12) United States Patent
Yan (10) Patent No.: US 10,907,699 B2
(45) Date of Patent: Feb. 2, 2021

(54) SLIDING FREQUENCY DEPENDENT PISTON ASSEMBLY (71) Applicant: Shi Yan, Aachen (DE)

(72) Inventor: Shi Yan, Aachen (DE)

(73) Assignee: Plush Ride GmbH, Aachen (DE)

( * ) Notice: Subject to any disclaimer, the term of this patent is extended or adjusted under 35 U.S.C. 154(b) by 112 days.

(21) Appl. No.: 16/473,253

(22) PCT Filed: Jan. 3, 2017

(86) PCT No.: PCT/BE2017/000003
§ 371 (c)(1),
(2) Date: Jun. 25, 2019

(87) PCT Pub. No.: WO2017/112980
PCT Pub. Date: Jul. 6, 2017

(65) Prior Publication Data
US 2020/0158204 A1 May 21, 2020

(51) Int. Cl.
F16F 9/512 (2006.01)
F16F 9/19 (2006.01)
(Continued)

(52) U.S. Cl.
CPC ............... F16F 9/512 (2013.01); F16F 9/19 (2013.01); F16F 9/3214 (2013.01); F16F 9/348 (2013.01);
(Continued)

(58) Field of Classification Search
CPC ...... F16F 9/19; F16F 9/34; F16F 9/182; F16F 9/185; F16F 9/348; F16F 9/464;
(Continued)

(56) References Cited

U.S. PATENT DOCUMENTS 9,534,653 B2    1/2017  Kim
10,774,896 B2 *  9/2020  Hamers ................ F16F 9/3481
(Continued)

FOREIGN PATENT DOCUMENTS

DE   10 2009 023686 A1   12/2010
DE   10 2015 205556 A1   10/2015
(Continued)

OTHER PUBLICATIONS

ISR: European Patent Office, NL; dated May 11, 2017.

Primary Examiner — Robert A. Siconolfi
Assistant Examiner — San M Aung
(74) Attorney, Agent, or Firm — Patshegen IP LLC; Moshe Pinchas (57) ABSTRACT A frequency dependent piston assembly (1) for a shock absorber comprising:
a piston (10) slidably disposed within a portion of cylinder (20), dividing volume defined within said portion of cylinder (20) into a first chamber (21) and a second chamber (22), said piston (10) comprising a flow channel (11) connecting said first chamber (21) and said second chamber (22); characterized in that said piston assembly (1) further comprises:
a valve assembly (100) controlling fluid flow (150) between said first chamber (21) and said second chamber (22), configured for its preload to be changed by movement of said piston (10);
a pressure chamber (300) comprising a chamber wall (301), configured to be moved by said piston (10) to change volume of said pressure chamber (300).

15 Claims, 6 Drawing Sheets (51) Int. Cl.
*F16F 9/32* (2006.01)
*F16F 9/348* (2006.01)
*F16F 9/516* (2006.01)

(52) U.S. Cl.
CPC ............ *F16F 9/3488* (2013.01); *F16F 9/516* (2013.01); *F16F 9/5126* (2013.01); *F16F 2222/12* (2013.01); *F16F 2228/04* (2013.01); *F16F 2228/066* (2013.01)

(58) Field of Classification Search
CPC .......... F16F 9/512; F16F 9/516; F16F 9/3214; F16F 9/3205; F16F 9/3405; F16F 9/3482; F16F 9/3485; F16F 2222/12; F16F 2228/04; F16F 2228/066; F16F 2228/12
USPC ......... 188/281, 275, 282.1, 282.8, 284, 287, 188/322.15, 282.9, 313, 316
See application file for complete search history.

(56) References Cited

U.S. PATENT DOCUMENTS

2013/0299291 A1* 11/2013 Ewers ..................... F16F 9/465
                                                    188/322.13
2015/0114774 A1*  4/2015 Kim ..................... F16F 9/3485
                                                    188/322.15
2015/0362038 A1* 12/2015 Kim ..................... F16F 9/3488
                                                    188/280
2017/0268595 A1*  9/2017 Inagaki ..................... F16F 9/46

FOREIGN PATENT DOCUMENTS

JP     2016098950 A  *  5/2016
WO     2015/185274 A1    12/2015

* cited by examiner

SLIDING FREQUENCY DEPENDENT PISTON ASSEMBLY

FIELD OF THE INVENTION

The present disclosure relates to hydraulic shock absorbers and dampers which can be adapted for use in a suspension system such as the systems used for transportation vehicles. More particularly, the present disclosure relates to a frequency dependent shock absorber, to provide different damping characteristics when subjected to input of differing frequencies.

BACKGROUND OF THE INVENTION AND PRIOR ART

Frequency dependent hydraulic dampers from prior art work on the principle of having a frequency dependent bypass channel to a main piston. These dampers still require a conventional main piston assembly to set the low frequency damping characteristics, and require a significant (~10 mm$^2$) bypass flow channel to be added into the rod's piston post. Examples of such prior art dampers are disclosed, for instance in documents WO03040586, WO2013051934, WO2015130544, WO2015030884.

There are three main problems with these dampers:
1) Reduced safety margin due to removal of material from a crucial structural element, the piston post, with possible fatal consequences in case of a strut suspension under side load.
2) Frequency dependent effect less effective at higher damper speeds due to restriction posed by limited flow channel in piston post.
3) Reduced damper travel leading to more end travel stop impacts which speed up damage to vehicle body and reduce comfort.

SUMMARY OF THE INVENTION

The present invention solves all the problems mentioned above as per the claims annexed to the present disclosure.

BRIEF DESCRIPTION OF THE DRAWINGS

The accompanying drawings comprise:

There is shown in FIG. 1 a first embodiment of the invention that is frequency dependent in both compression and rebound.

There is shown in FIG. 2 the first embodiment of the invention after some time in rebound travel.

There is shown in FIG. 3 the first embodiment of the invention after some time in compression travel.

There is shown in FIG. 4 a second embodiment of the invention that is frequency dependent only in rebound and the cylinder (20) is a housing.

There is shown in FIG. 5 a third embodiment of the invention in which the chamber wall (301) is formed by the piston (10).

There is shown in FIG. 6 a fourth embodiment of the invention in which a flexible chamber wall (301) is used.

DESCRIPTION OF REFERENCE NUMERALS

1: Frequency dependent piston assembly
2: Second piston assembly
10: Piston
11: Flow channel (between chamber 1 and chamber 2)
20: Portion of cylinder
21: First chamber
22: Second chamber
30: Rod
31: Stepped smaller diameter portion
32: Second stepped smaller diameter portion
33: Clamping washer
34: Clamping nut
100: Valve assembly
150: Fluid flow
300: Pressure chamber
301: Chamber wall
302: Chamber seal
303: Chamber base
380: Flow restrictor
381: Orifice disc
382: Check disc
390: Elastic element

DETAILED DESCRIPTION OF THE DRAWINGS

The following description of the preferred embodiments is merely exemplary in nature and is in no way intended to limit the disclosure, its applications, or uses. Whenever the same reference number occur on different drawings, the same reference number designates similar or corresponding parts throughout the different drawings.

The present invention solves the problems mentioned above by using a different working principle than in the known prior art documents. Instead of having a frequency dependent bypass the piston, the fluid flow through the piston is subjected to a frequency dependent throttling.

Figure 1:
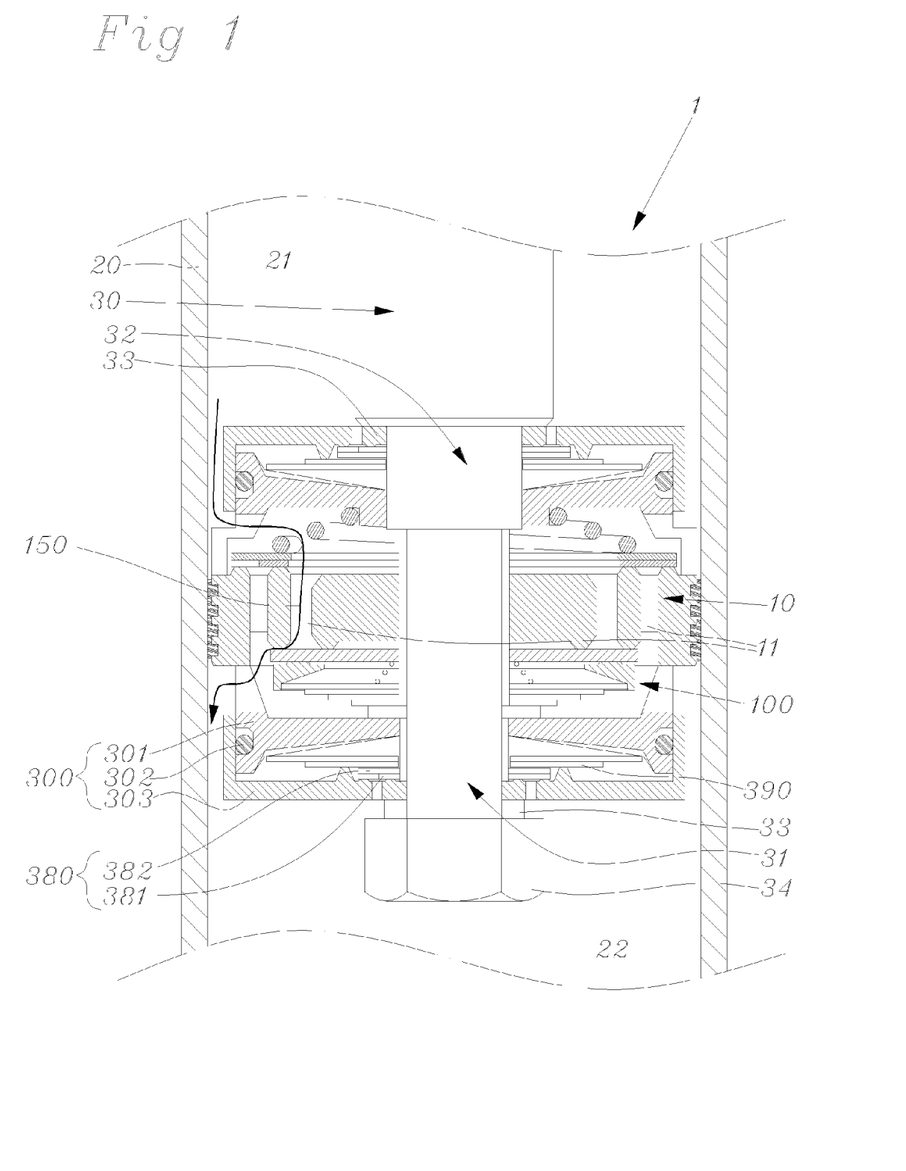

In FIG. 1 a first embodiment of the invention is shown and will be described in the following.

A frequency dependent piston assembly (1) for a shock absorber comprises a piston (10) slidably disposed within a portion of a cylinder (20), dividing volume defined within the portion of cylinder (20) into a first chamber (21) and a second chamber (22). The piston (10) comprises a flow channel (11) connecting the first chamber (21) and the second chamber (22).

The piston assembly (1) further comprises a valve assembly (100) controlling fluid flow (150) between the first chamber (21) and the second chamber (22). The valve assembly (100) is configured, as it will be described in the following, for its preload to be changed by movement of the piston (10).

The piston assembly (1) comprises a pressure chamber (300) with a chamber wall (301), configured to be moved by the piston (10) to change the volume of the pressure chamber (300).

The valve assembly (100) is disposed against the piston (10), covering the flow channel (11) to throttle fluid flow (150) between the first chamber (21) and the second chamber (22).

The chamber wall (301) is configured to be pushed by movement of the piston (10) upon a pressure differential between the first chamber (21) and the second chamber (22) to reduce volume of the pressure chamber (300).

The piston assembly (1) also comprises a chamber base (303) which limits the allowed range of movement of the chamber wall (301).

The piston (10) is not fixed relative to the rod (30) but can slide on it. The movement of the piston (10) is controlled via the pressure chamber (300) which changes in volume when the piston (10) moves. The valve assembly (100) is fixed on the rod (30) so that movement of the piston (10) has the effect to change a preload on the valve assembly (100). The preload of the valve assembly (100) is thus controlled by the pressure chamber (300). This eliminates the need for a large bypass channel and saves on dead length—damper travel which is used up by the dimensions of the piston assembly, and reduces the number of components.

Furthermore, in the embodiment of FIG. 1 it can be seen that
the piston (10) is connected to a stepped smaller diameter portion (31) of the rod (30), this is portion of the rod (30) over which the piston (10) can slide. The rod (30) also comprises a second stepped smaller diameter portion (32), to improve strength under side load, interposed between the full diameter portion of the rod (30) and the smaller diameter portion (31). The valve assembly (100) is positioned over this second stepped smaller diameter portion (32).

The rod (30) projects out of and reciprocates in the cylinder (20), as in prior art dampers.

The chamber wall (301) comprises a plate, which is rigid in this embodiment but can also be flexible as will be shown in a later embodiment.

The pressure chamber (300) is clamped by a clamping washer (33), which acts as a clamping washer also for the whole piston assembly, thus saving space.

The piston assembly further comprises a flow restrictor (380) to throttle fluid flow into or out of the pressure chamber (300), to better control the speed with which the pressure chamber (300) changes volume.

The flow restrictor (380) comprises a thin orifice disc (381), the orifice disc (381) can be exchanged with other thin orifice discs having orifices with different cross sections, in this way the flow restrictor (380) can be tuned as required.

The flow restrictor (380) comprises a check disc (382) which opens up a bigger flow cross section depending on flow direction, so that once the damper reverses its travel direction, the pressure chamber (300) is able to easily return to its original volume.

Figure 2:
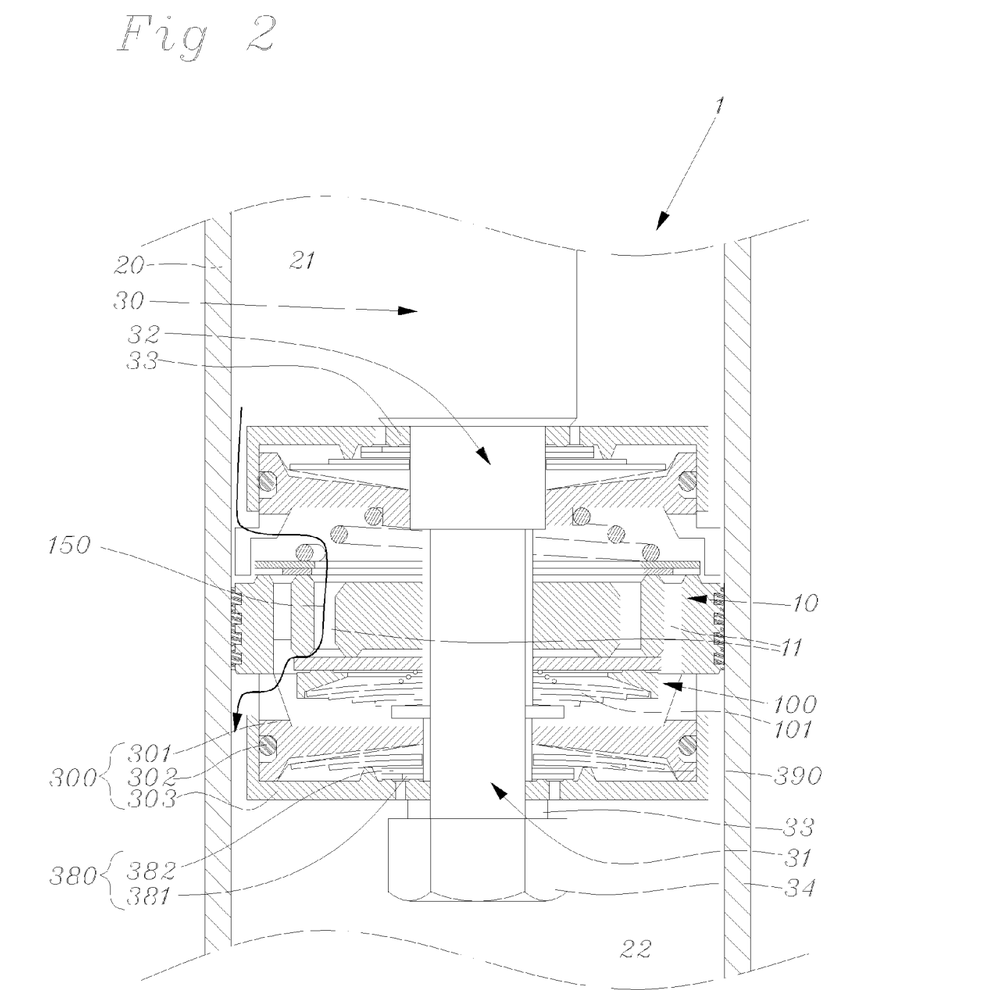

There is shown in FIG. 2 the situation after some time has passed in the rebound travel with the first chamber (21) having a higher pressure than the second chamber (22). Pressure chamber wall (301) has been pushed by piston (10) to its end stop against chamber base (303). At the same time, valve discs (101) in the valve assembly (100) have been preloaded by movement of the piston (10) so that the valve assembly (100) throttles fluid flow (150) through the piston (10) even more, thus resulting in higher damping force generation than in the moment depicted in FIG. 1. By changing the distance the chamber wall (301) is allowed to move, by positioning the chamber base (303) accordingly, it is possible to change the allowed amount of preload force variation range in the valve assembly (100). Also shown in the figure is an elastic element (390) configured to help the valve assembly (100) oppose the movement of the piston (10), thus helping the pressure chamber (300) to return to its resting state and volume.

Figure 3:
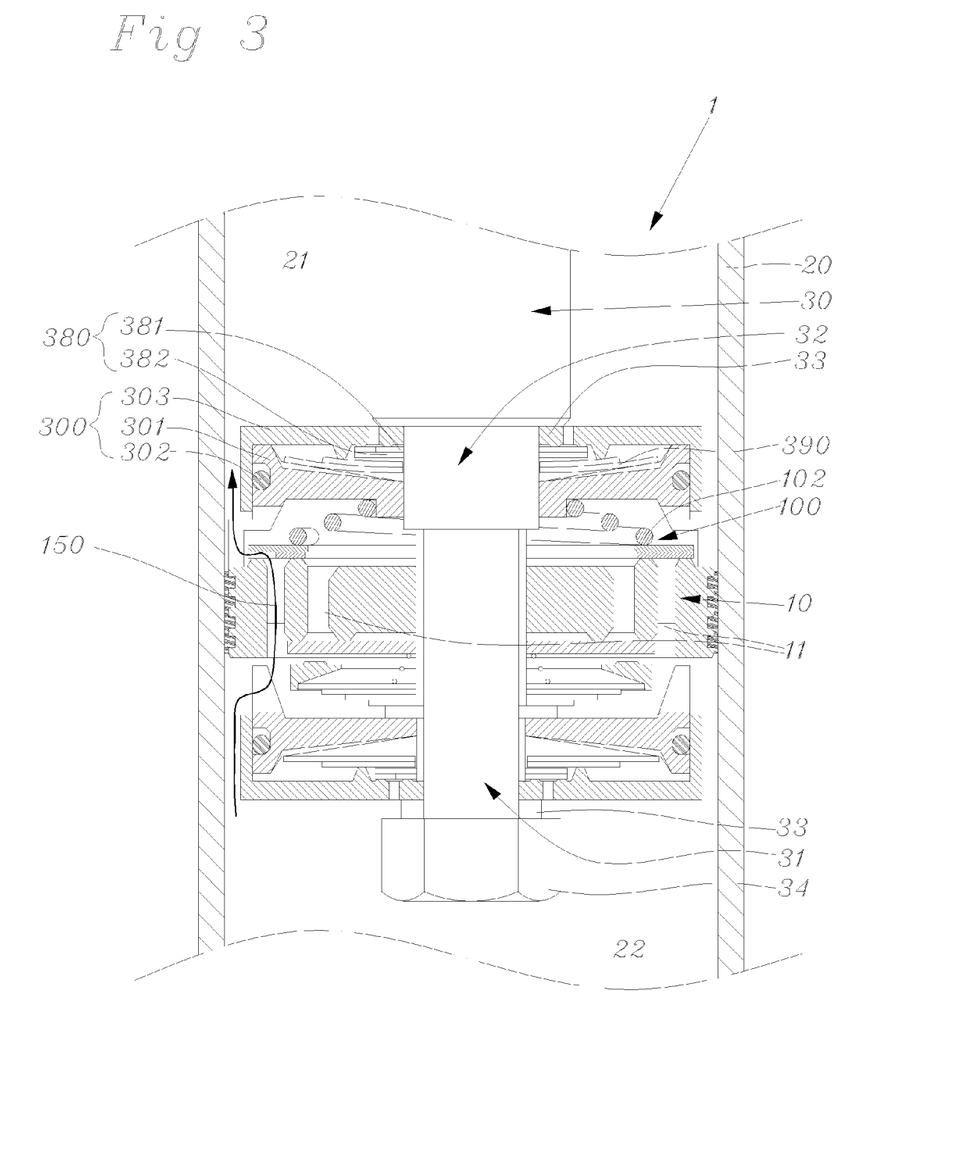

There is shown in FIG. 3 the situation with opposite direction of damper travel compared to FIG. 2, after some time has passed with the second chamber (22) having a higher pressure than the first chamber (21). As an alternative to valve discs, a coil spring (102) is used in the valve assembly (100) of this figure and has been preloaded by movement of the piston (10) so that the valve assembly (100) throttles fluid flow (150) through the piston (10) more than in its less preloaded state.

Figure 4:
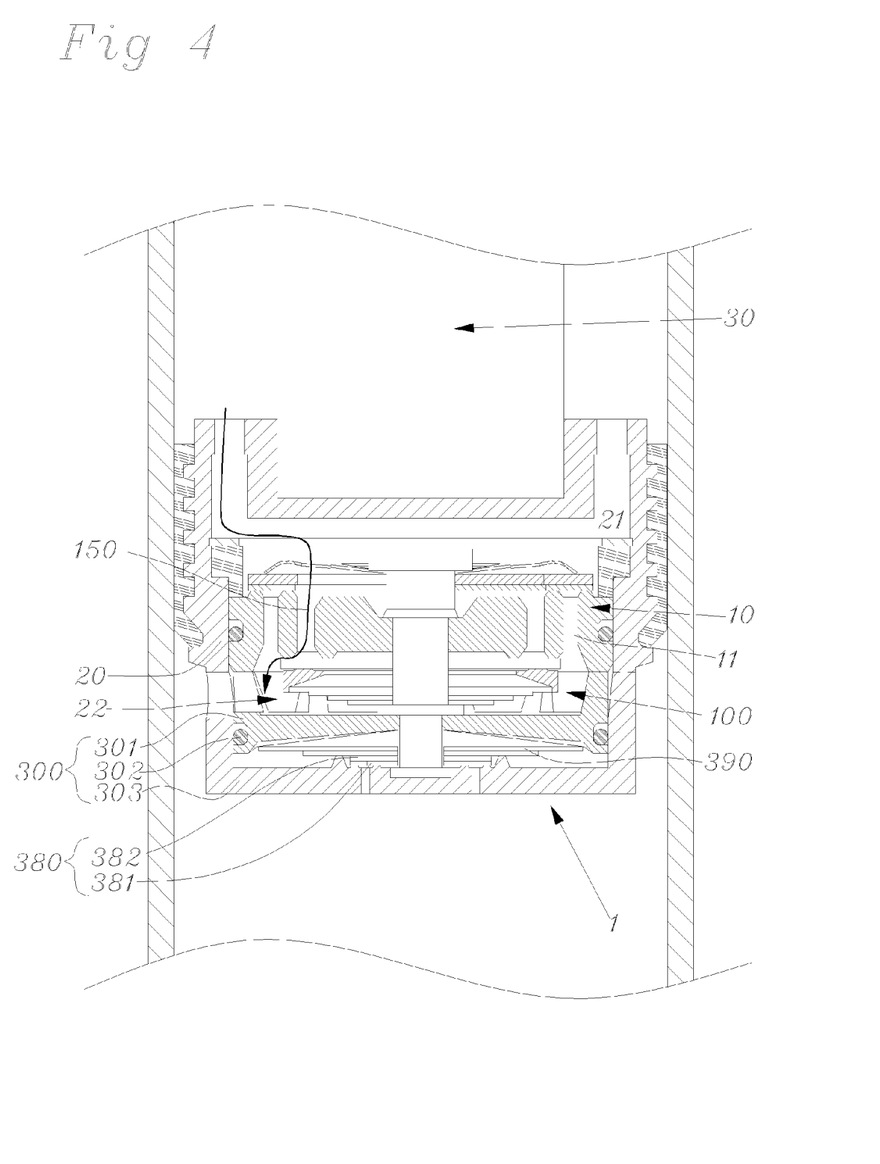

In FIG. 4 a second embodiment of the invention is shown and will be described in the following.

The piston assembly (1) is positioned inside the portion of cylinder (20), which is a housing containing the piston assembly (1), rather than a damper tube in which the piston assembly slides, the housing could itself slide within a damper tube but could also be statically mounted outside of the damper while hydraulically communicating with the damper tubes within the damper. The piston assembly (1) is only frequency dependent in one direction (rebound). It is to be noted that the use of two pressure chambers in the piston assembly (1), as in previous figures, or a single pressure chamber, as in FIG. 4, are both viable options.

Figure 5:
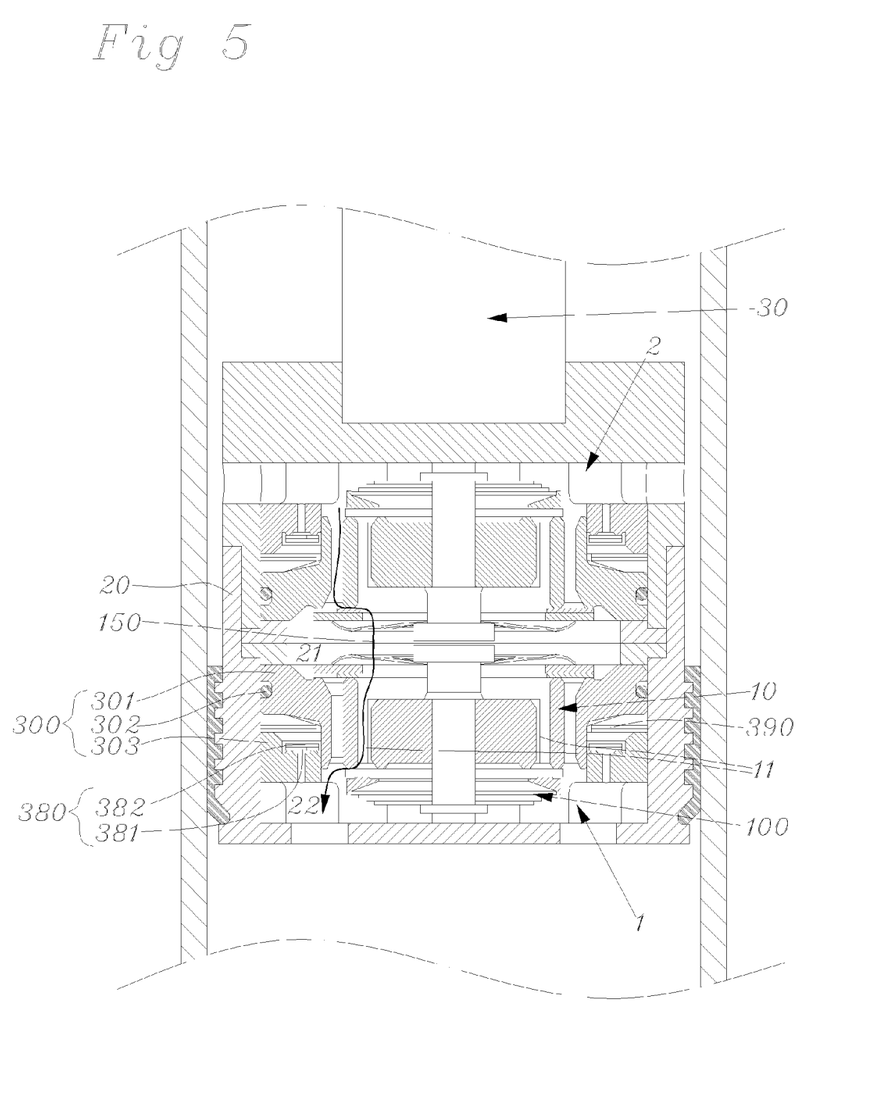

There is shown in FIG. 5 a third embodiment of the invention in which a second piston assembly (2) is also used, which functions similarly to the first piston assembly (1). The frequency dependent piston assembly (1) for a shock absorber comprises the piston (10) slidably disposed within a portion of cylinder (20), dividing a volume enclosed within the portion of cylinder (20) into the first chamber (21) and the second chamber (22).

The piston (10) comprises a flow channel (11) connecting the first chamber (21) and the second chamber (22).

The piston assembly (1) further comprises a pressure chamber (300) comprising a chamber wall (301), configured to be moved by the piston (10) to change volume of the pressure chamber (300);

The piston assembly (1) further comprises a valve assembly (100) controlling fluid flow (150) between the first chamber (21) and the second chamber (22), the valve assembly (100) being configured for its preload to be changed by movement of the piston (10), the throttling of fluid flow (150) by the valve assembly (100) being dependent on the preload of the valve assembly (100).

Furthermore, in the embodiment of FIG. 5 it can be seen that the portion of cylinder (20) is a housing and that the chamber wall (301) is part of the piston (10).

Figure 6:
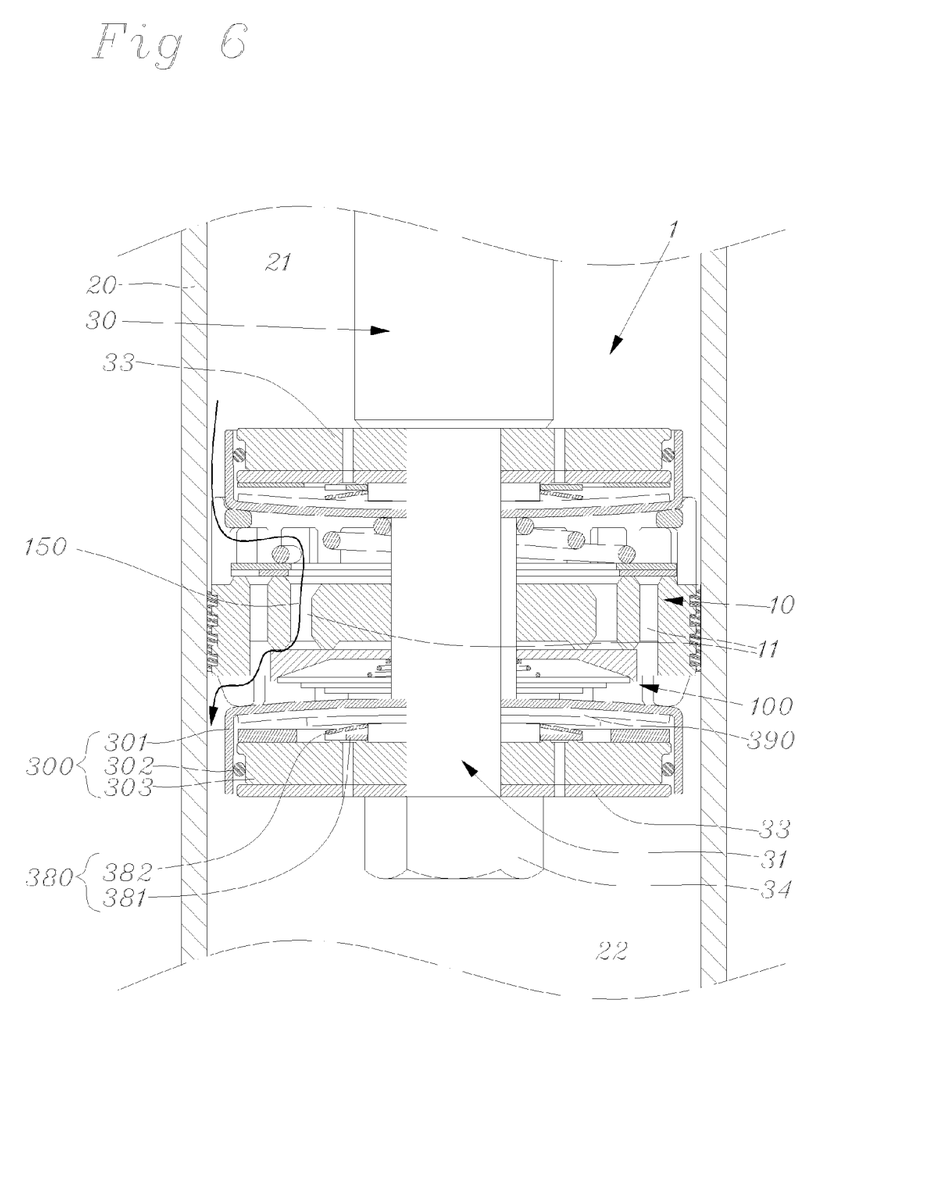

There is shown in FIG. 6 an embodiment of the invention in which a flexible chamber wall (301) is used, where the elastic element (390) as well as the chamber wall (301) are slightly preloaded in the resting state of the piston assembly (1), so that the piston (10) and the chamber wall (301) are always in contact during damper travel. Before assembly into the piston assembly (1), elastic element (390) and chamber wall (301) are flat, before becoming curved as shown in this figure due to the preloading. This alternative configuration for the elastic element (390) can also be applied to the rigid chamber wall (301) as used in the first embodiment described in relation with FIGS. 1-3.

The chamber base (303) is for depicted as comprising 2 separate pieces in FIG. 6 for ease of manufacturability reasons.

As shown in the embodiments, the present invention can be applied to a single side or to both sides of a piston (10), to achieve frequency dependency in just one or both directions of damper travel.

While the present invention has been described with reference to the embodiments, it will be apparent to those skilled in the art that various changes and modifications may be made as defined in the following claims.

What is claimed is:

1. A frequency dependent piston assembly for a shock absorber comprising:
a piston slidably disposed within a portion of cylinder, dividing volume defined within said portion of cylinder into a first chamber and a second chamber, said piston comprising a flow channel connecting said first chamber and said second chamber;

characterized in that said piston assembly further comprises:
- a pressure chamber comprising a chamber wall, configured to be moved by said piston to change volume of said pressure chamber;
- a valve assembly controlling fluid flow between said first chamber and said second chamber,
- said valve assembly being configured for its preload to be changed by the change in volume of said pressure chamber, the throttling of fluid flow by said valve assembly being dependent on the preload of said valve assembly.

2. The piston assembly according to claim 1, characterized in that:
said chamber wall is flexible.

3. The piston assembly according to claim 1, characterized in that:
said chamber wall is rigid.

4. The piston assembly according to claim 1, characterized in that:
said valve assembly is disposed against said piston, covering said flow channel to throttle fluid flow between said first chamber and said second chamber.

5. The piston assembly according to claim 1, characterized in that:
said chamber wall is configured to be pushed by movement of said piston upon a pressure differential between said first chamber and said second chamber to reduce volume of said pressure chamber.

6. The piston assembly according to claim 1, characterized in that said piston assembly further comprises:
a chamber base which limits the allowed range of movement of said chamber wall.

7. The piston assembly according to claim 6, characterized in that:
said chamber base also functions as a clamping washer or clamping nut.

8. The piston assembly according to claim 1, characterized in that:
said chamber wall is configured to be pulled by movement of said piston upon lower pressure in said first chamber than said second chamber to increase volume of said pressure chamber.

9. The piston assembly according to claim 1, characterized in that:
said piston is attached to a rod,
said piston is able to move relative to said rod.

10. The piston assembly according to claim 1, characterized in that said piston assembly further comprises:
an orifice disc with a flow slot which changes width from its inner diameter to outer diameter.

11. The piston assembly according to claim 1, characterized in that:
said chamber wall is part of said piston.

12. The piston assembly according to claim 1, characterized in that said piston assembly further comprises:
a flow restrictor to throttle fluid flow into or out of said pressure chamber.

13. The piston assembly according to claim 12, characterized in that:
said flow restrictor comprises a thin orifice disc.

14. The piston assembly according to claim 12, characterized in that:
said flow restrictor opens up a bigger flow cross section depending on flow direction.

15. The piston assembly according to claim 1, characterized in that said piston assembly further comprises:
an elastic element configured to help said valve assembly oppose movement of said piston.

* * * * *